(12) United States Patent
van Schalkwijk et al.

(10) Patent No.: US 11,772,896 B2
(45) Date of Patent: Oct. 3, 2023

(54) MODULAR NOSEROLLER ASSEMBLY FOR A CONVEYOR

(71) Applicant: Laitram, L.L.C., Harahan, LA (US)

(72) Inventors: David Aaron van Schalkwijk, Metairie, LA (US); John E. Wenzel, Madisonville, LA (US); Sijia Chen, Shanghai (CN); R. Scott Dailey, Destrehan, LA (US); Richard M. Klein, Slidell, LA (US)

(73) Assignee: Laitram, L.L.C., Harahan, LA (US)

( * ) Notice: Subject to any disclaimer, the term of this patent is extended or adjusted under 35 U.S.C. 154(b) by 79 days.

(21) Appl. No.: 17/602,852

(22) PCT Filed: Apr. 21, 2020

(86) PCT No.: PCT/US2020/029096
§ 371 (c)(1),
(2) Date: Oct. 11, 2021

(87) PCT Pub. No.: WO2020/219434
PCT Pub. Date: Oct. 29, 2020

(65) Prior Publication Data
US 2022/0162006 A1    May 26, 2022

Related U.S. Application Data

(60) Provisional application No. 62/836,942, filed on Apr. 22, 2019.

(51) Int. Cl.
*B65G 15/60*    (2006.01)
*B65G 39/04*    (2006.01)
*B65G 39/12*    (2006.01)

(52) U.S. Cl.
CPC ............. *B65G 15/60* (2013.01); *B65G 39/04* (2013.01); *B65G 39/12* (2013.01)

(58) Field of Classification Search
CPC ........ B65G 15/60; B65G 39/04; B65G 39/12; B65G 47/66
See application file for complete search history.

(56) References Cited

U.S. PATENT DOCUMENTS 4,813,135 A * 3/1989 Kuwica ................. B27B 17/025
30/387
5,186,313 A * 2/1993 Denker ................. B65G 39/16
198/840

(Continued)

FOREIGN PATENT DOCUMENTS

CH    703679 B1    3/2012
EP    2088340 A1    8/2009

OTHER PUBLICATIONS

Extended European Search Report, European Patent Application No. 20794078.4, dated May 2, 2023, European Patent Office, Munich, Germany.

*Primary Examiner* — Mark A Deuble
(74) *Attorney, Agent, or Firm* — Catherine M. Bishop

(57) ABSTRACT

A modular noseroller assembly for transitioning a conveyor belt at an end of a carryway comprises a plurality of roller-mounting modules connected to a spacer element to form a noseroller assembly that can be installed in a conveyor frame. The roller-mounting modules mount freely-rotating rollers on an axle extending through the plurality of roller-mounting modules. The configuration and size of the noseroller assembly can be easily modified depending on a particular application.

16 Claims, 8 Drawing Sheets

(56) References Cited

U.S. PATENT DOCUMENTS

| | | | | |
|---|---|---|---|---|
| 6,376,619 B1* | 4/2002 | Halverson | ............... | B82Y 30/00 |
| | | | | 525/383 |
| 6,857,516 B1 | 2/2005 | Verdigets | | |
| 6,997,309 B2 | 2/2006 | Stebnicki et al. | | |
| 7,549,531 B2* | 6/2009 | Hosch | ................... | B65G 23/44 |
| | | | | 198/813 |
| 7,584,839 B2* | 9/2009 | Bugge | ................ | B65G 21/2072 |
| | | | | 198/841 |
| 7,762,387 B2 | 7/2010 | Dunn | | |
| 7,775,345 B2 | 8/2010 | Fourney | | |
| 8,967,373 B2* | 3/2015 | Nils | ....................... | B65G 15/62 |
| | | | | 198/816 |
| 9,108,802 B2* | 8/2015 | Wehner | ................... | B65G 15/20 |
| 9,340,370 B2* | 5/2016 | Seger | ..................... | B65G 47/53 |
| 11,440,738 B2* | 9/2022 | Schmidt | ................ | B65G 21/00 |
| 2006/0237293 A1 | 10/2006 | Karpy | | |
| 2007/0017786 A1* | 1/2007 | Hosch | ................... | B65G 47/66 |
| | | | | 198/841 |
| 2007/0227861 A1 | 10/2007 | Stebnicki et al. | | |
| 2018/0244472 A1 | 8/2018 | MacLachlan et al. | | |
| 2018/0265309 A1 | 9/2018 | Yasinski et al. | | |
| 2022/0234841 A1* | 7/2022 | Marsetti | ................ | B65G 23/06 |

\* cited by examiner

US 11,772,896 B2

MODULAR NOSEROLLER ASSEMBLY FOR A CONVEYOR

RELATED APPLICATIONS

This application claims priority to U.S. Provisional Patent Application No. 62/836,942, filed Apr. 22, 2019, entitled "Modular Noseroller Assembly for a Conveyor", the contents of which are herein incorporated by reference.

FIELD OF THE INVENTION

The present application relates to power-driven conveyors. More particular, the present invention relates to a modular noseroller assembly for transitioning a conveyor belt between a carryway and a returnway.

BACKGROUND OF THE INVENTION

Conveyor belts are widely used in various industries to convey products, Endless conveyor belts are generally trained around reversing elements, such as sprockets or noserollers, to form an endless circuit having a carryway and returnway. Modular plastic conveyor belts are constructed of a series of rows of side-by-side belt modules. Hinge eyes along opposite ends of each row interleave with hinge eyes of consecutive rows. A hinge rod inserted in the interleaved hinge eyes connects the rows together at hinge joints into an endless conveyor belt loop.

In a conveyor system, noserollers or other reversing elements can be used to transition a conveyor belt from a carryway to a returnway. Noserollers may be required to accommodate different types of belts and configurations and operate in abrasive environments.

SUMMARY OF THE INVENTION

A noseroller assembly for a conveyor comprises a plurality of roller-mounting modules connected to a spacer element to form a noseroller assembly that can be installed in a conveyor frame. The configuration and size of the noseroller assembly can be easily modified depending on the particular application.

According to an embodiment, a modular noseroller assembly for transitioning a conveyor belt at an end of a carryway comprises a spacer element, a first roller-mounting module connected to the spacer element, the first roller-mounting module having a first front recess for mounting a first roller and a first opening for receiving an axle, a first roller mounted on the axle in the first front recess, a second roller-mounting module connected to the spacer element, the second roller-mounting module having a second front recess for mounting a second roller and a second opening for receiving the axle and a second roller mounted on the axle in the second front recess. An axle extends through the first roller, the first opening, the second roller and the second opening.

According to another embodiment, a modular noseroller assembly comprises a base plate extending from a first side to a second side and from a front edge to a rear edge and including a first mounting opening in the front edge and a second mounting opening in the front edge. A first noseroller-mounting module is mounted in the first mounting opening and a second noseroller-mounting module mounted in the second mounting opening;

In another embodiment, a roller-mounting module for mounting a roller to a spacer element of a modular noseroller assembly comprises a spacer-connecting portion for mounting the roller-mounting module to a spacer element, a roller-holding portion extending substantially perpendicular to the plate-connecting portion for mounting a roller and a connector for connecting the roller-mounting module to the spacer element.

In another embodiment, a method of assembling a modular noseroller assembly, comprises the steps of providing a spacer element, mounting a first roller-mounting module to the spacer element, mounting a second roller-mounting module to the spacer element, inserting rollers in front recesses of the first and second roller-mounting modules and sliding an axle through the rollers and aligned front openings in the spacer elements to integrate the rollers in the assembly.

BRIEF DESCRIPTION OF THE FIGURES

These features and aspects of the invention, as well as its advantages, are better understood by referring to the following description, appended claims, and accompanying drawings, in which:

DETAILED DESCRIPTION OF THE INVENTION

A modular noseroller assembly for a conveyor facilitates transitioning of a conveyor belt between a carryway and a returnway and can be easily assembled and configured. The invention will be described below relative to certain illustrative embodiments, though those skilled in the art will recognize that the invention is not limited to the described embodiments.

Figure 1:
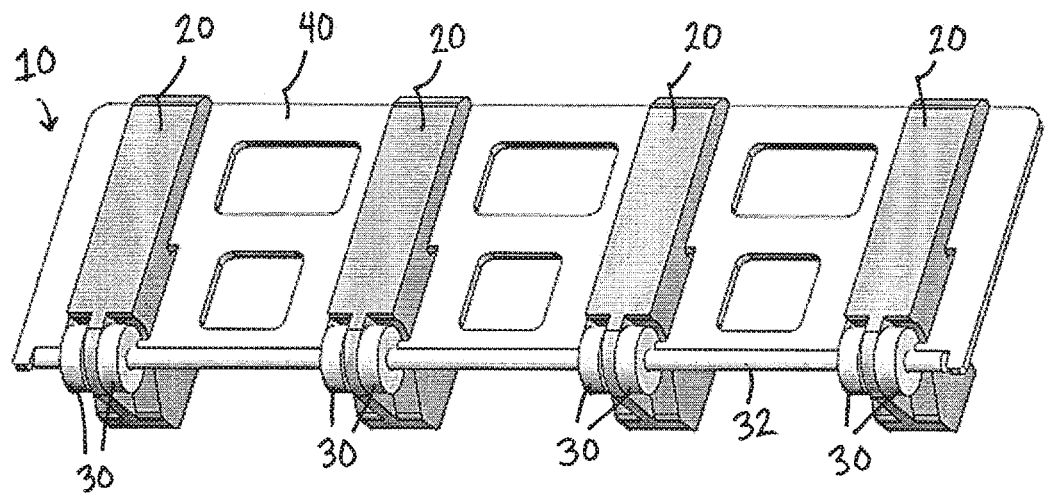
FIG. 1 is an isometric view of a modular noseroller assembly according to an embodiment of the invention.

FIG. 1 shows an embodiment of a modular noseroller assembly 10 suitable for guiding a conveyor belt between a carryway and a returnway. The noseroller assembly 10 may be placed at an infeed or outfeed end of a carryway in a conveyor. The modular noseroller assembly 10 comprises a plurality of roller-mounting modules 20 mounting rollers 30, shown as bearings, for contacting and guiding the conveyor belt at selected locations across the width of the conveyor belt. Each illustrative roller-mounting module 20, mounts a pair of rollers 30, but the invention is not so limited, and fewer or more rollers can be provided with each module. The roller-mounting modules 20 are separated by and connected to a spacer element 40. An axle 32 extends through the series of rollers 30, positioning the rollers, ensuring all the rollers 30 are coaxial and allowing free rotation of the roller about the axle 32. The axle 32 connects the roller-mounting modules 20 together, preventing removal of the roller-mounting modules 20. Alternatively, separate, coaxial axles may be used. In another embodiment, the separate axles may be offset from each other to provide offset rollers, if desirable. The spacer element 40 positions and spaces the rollers relative to each other to form a singular noseroller assembly that may be integrated into a conveyor frame. The illustrative bearings are about ¾ inch in diameter, but the rollers may have any suitable size and thickness depending on the desired application. The rollers 30 may be separated by any suitable separation distance, depending on the configuration of the conveyor belt being guided by the modular noseroller assembly 10.

Figure 2:
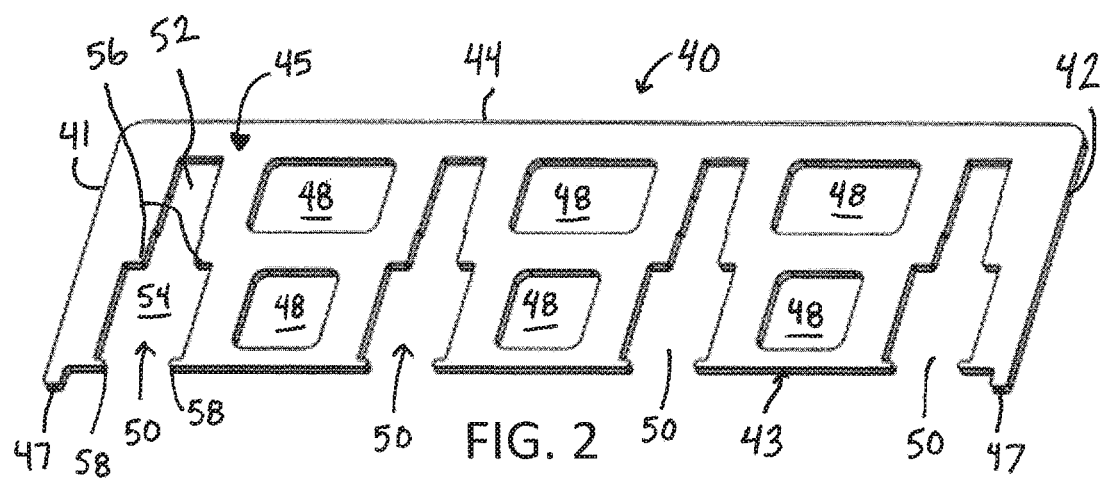
FIG. 2 is an isometric view of a base plate of the modular noseroller assembly of FIG. 1.

Referring to FIG. 2, the illustrative spacer element may comprise a base plate 40 formed of laser-cut sheet metal with a plurality of openings. The base plate 40 extends from a first side 41 to a second side 42, from a front edge 43 to a back edge 44 and from a top surface 45 to an opposite bottom surface (not shown). The base plate 40 may span the width of the conveyor frame, which may range from a few inches to several feet. Or, several base plates 40 arranged in series may span the width of the frame. A series of mounting openings 50 are formed in the front edge 43 and extend towards the back edge 44 for mounting and positioning the roller-mounting modules 20. The base plate 40 may also include weight-reducing openings 48 for reducing the weight of the base plate without compromising the strength and integrity of the base plate 40.

Each illustrative mounting opening 50 comprises a narrow rear slot 52, a wider front slot 54 and a narrowed entrance defined by lip 58. The narrow rear slot 52 forms shoulders 56 in the base plate 40 for mounting a roller-mounting module 20, as described below. However, other suitable means for mounting the roller-mounting module 20 may be used.

End projections 47 extending forward from the front edge 43 at each side 41, 42 of the base plate 40 are used to contain the axle 32 when mounted through the roller-mounting modules 20.

Figure 3:
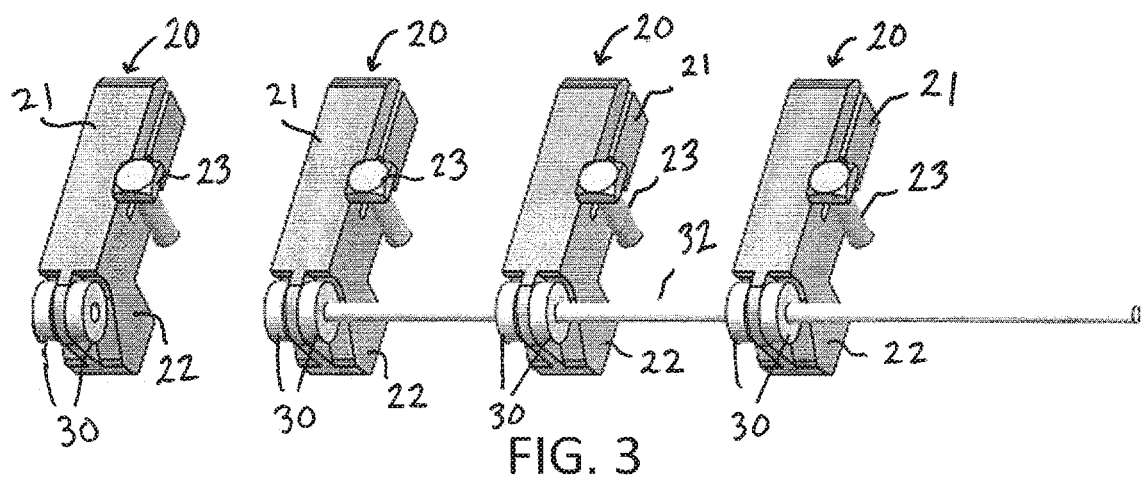
FIG. 3 is an isometric view of the roller-mounting modules and axle of the modular noseroller assembly of FIG. 1.
Figure 4:
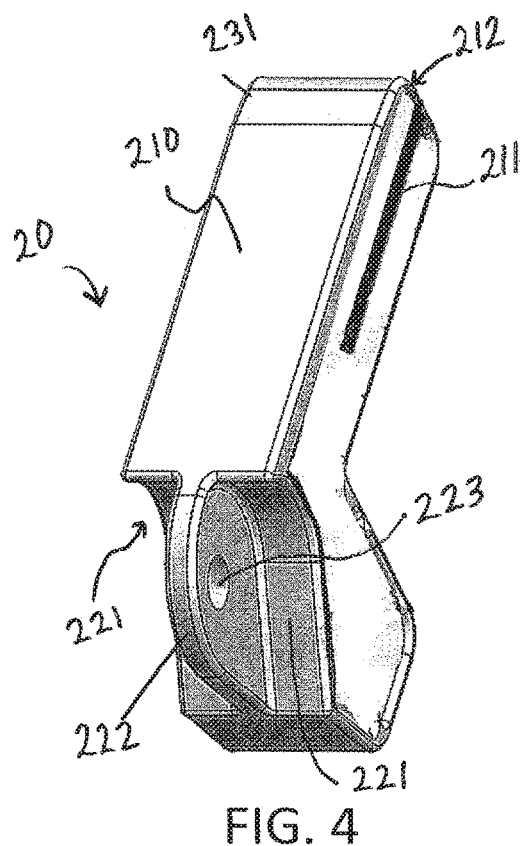
FIG. 4 is an isometric view of a single roller-mounting module of the modular noseroller assembly of FIG. 1.
Figure 5:
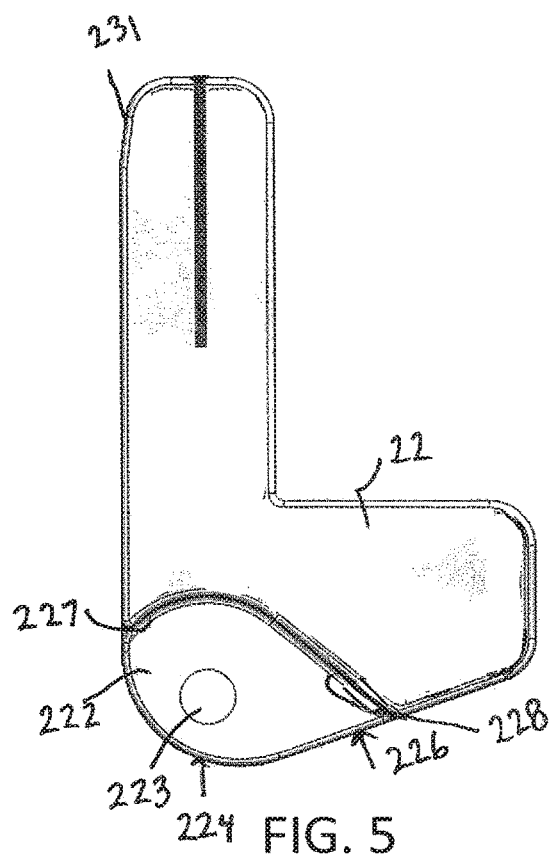
FIG. 5 is a side view of the roller-mounting module of FIG. 4.
Figure 6:
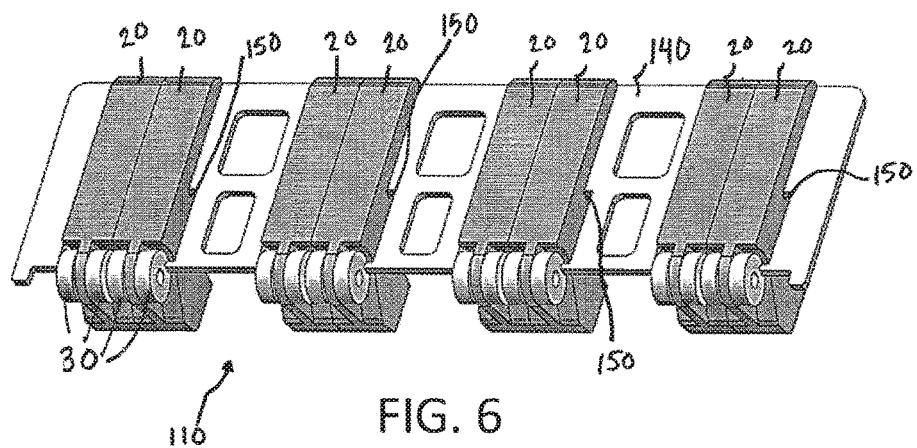
FIG. 6 is an isometric view of a modular noseroller assembly of another embodiment of the invention.
Figure 7:
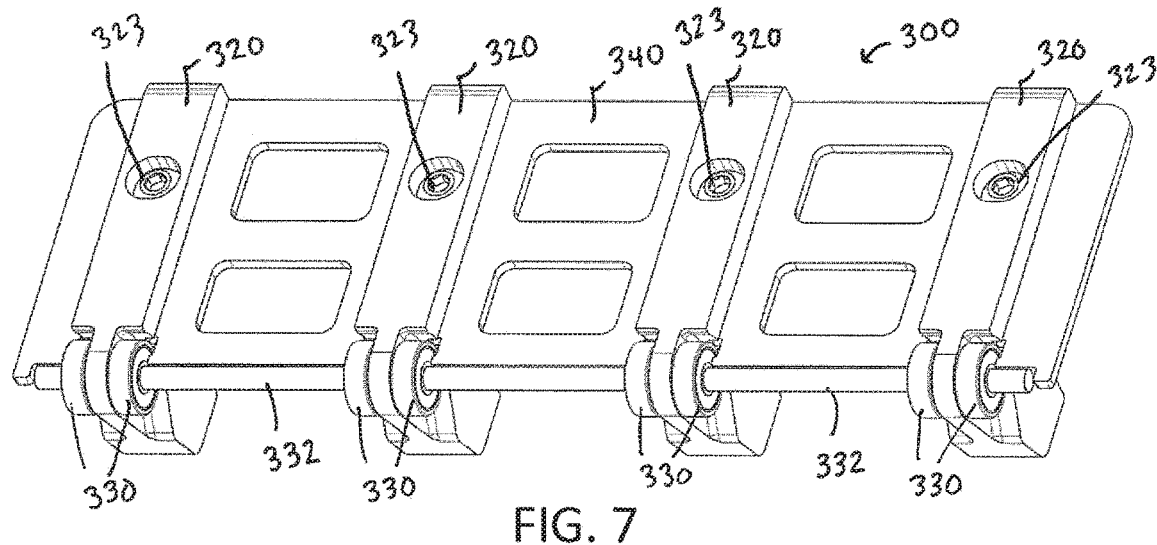
FIG. 7 is an isometric view of a modular noseroller assembly of another embodiment of the invention.
Figure 8:
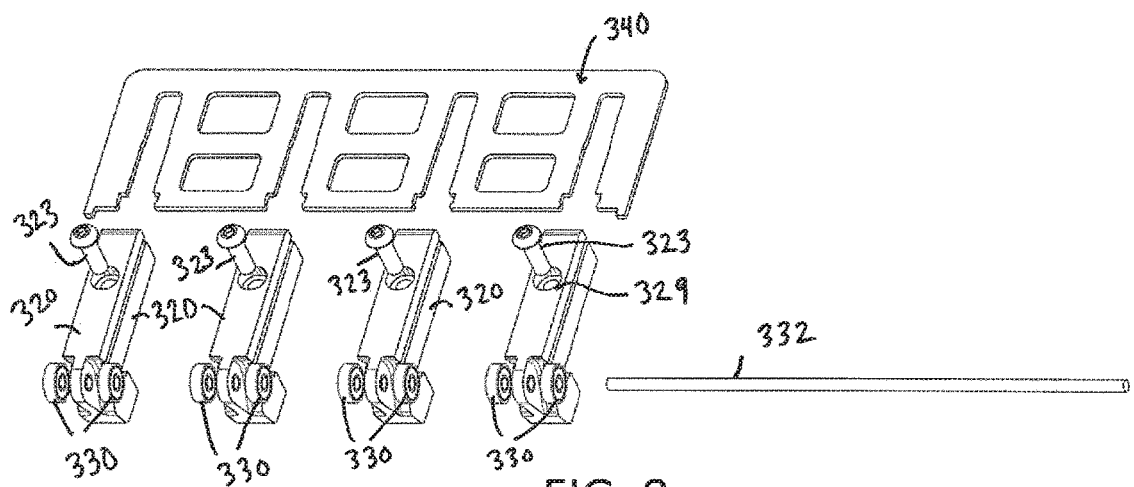
FIG. 8 is an exploded view of the modular noseroller assembly of FIG. 7.

Each opening 50 holds an associated roller-mounting module 20 in a selected position and orientation. Referring to FIGS. 3-5, the roller-mounting modules 20 may comprise injection-molded plastic, machined plastic or compression molded plastic, though the invention is not so limited, and other materials and manufacturing methods may be used. Each roller-mounting module 20 comprises a plate-connecting portion 21 for mounting the module 20 to a spacer and a roller-holding portion 22, shown as extending substantially perpendicular to the plate-connecting portion, for mounting rollers 30. The plate-connecting portion 21 also includes an attachment bolt 23 for mounting the noseroller assembly 10 to a mounting plate or other suitable mounting structure in a conveyor frame.

As shown in FIGS. 4 and 5, the plate-connecting portion of the roller-mounting module 20 has a top surface 210 and a mounting slot 211 extending from a back wall 212 towards the middle of the plate connecting portion 21, though other suitable means for mounting the roller-mounting module 20 to a spacer may be used. The top surface 210 provides a wear surface for contacting the conveyor belt and is positioned above the base plate 40 when assembled. The rear top edge 231 may be angled, chamfered, or rounded, to facilitate lead-in of an approaching conveyor belt.

The roller-holding portion 22 extends down and substantially perpendicular to the plate-connecting portion 21 and includes front recesses 221 separated by a stanchion 222 for holding a pair of rollers 30. The stanchion 222 has an opening 223 for receiving the axle 32. Alternatively, the roller-holding portion 22 can be comprise a single recess with axle-mounting walls on each side, or multiple recesses and stanchions. The stanchion 222 has a curved outer wall 224 that is slightly recessed from the rollers 30 when assembled to prevent interference with the conveyor belt. The curved outer wall 224 transitions to an inwardly sloping front wall 226. The conveyor belt rides against the sloping front wall 226, the angle of which may be configured to prevent or reduces vibration in the conveyor belt. The illustrative sloping front wall 226 is angled inwards between about 15° and about 30° and preferably between about 20° and about 25° relative to vertical. The illustrative angle is 22° relative to vertical, but the invention is not so limited. The illustrative sloping front wall 226 extends for a length that is about 1.5 times the length of the pitch for a conveyor belt employing the noseroller assembly 10, to limit vibrations, but the invention is not so limited. The wall of the recess 221 also has a curved portion 227 and a straight portion 228 that intersects the sloping front wall 226, to give the stanchion 222 the shape of an asymmetric tear-drop, with the opening 223 offset from the center. The space under the rollers 330 in the front recesses 221 prevents or limits dust build-up. Other suitable configurations may be used.

The roller-mounting module 20 can include cut-outs to reduce the overall weight of the module.

The rollers 30 can comprises any suitable type of roller suitable for contacting and guiding a conveyor belt, and preferably rotate freely about the axle 32.

The illustrative noseroller assembly 10 may be easily assembled from modular components. A base plate 40 of a desired size and configuration for a particular conveyor and conveyor belt may be selected. Then, roller-mounting modules 20 may be individually inserted in each mounting opening 50 by sliding the shoulders 56 through the slots 211 and the roller-holding portion 22 into the front slot 54. Then, rollers 30 are positioned in the recesses 221 and the axle 32 slid through the rollers 30 and openings 223. The axle 32 is held in place by projections 47 in the base plate 40. The assembly 10 may then be bolted to the conveyor frame using bolts 23.

In addition to being easily manufactured, assembled, hardy and durable in abrasive environments and—or dusty conditions, the modular noseroller assembly 10 can be easily modified and customized to fit and accommodate different conveyor belts and frames. For example, as shown in FIG.

6, a higher-density modular noseroller assembly 110 comprises a base plate 140 that may include a series of spaced-apart double-wide openings 150 to accommodate two adjacent roller-mounting modules 20, increasing the density and number of rollers 30 in the noseroller assembly. The size, length and configuration of openings in a base plate may be varied according to the specific design needs of the conveyor employing a modular noseroller assembly comprising the base plate.

FIGS. 7-12 show another embodiment of a modular noseroller assembly 300 including a series of roller-mounting modules 320 separated by and mounted to a spacer element, shown as a base plate 340. Similar to the embodiment of FIGS. 1-6, the roller-mounting modules 320 each mounts a pair of rollers 330, but any suitable number of rollers may be mounted on each roller-mounting module 320, and the distance between roller-mounting modules may be modified depending on the particular application and conveyor belt. An axle 332 upon which the rollers 330 freely rotate extends through the series of rollers 330 to connect the rollers 330 and roller-mounting modules 320.

Fasteners, shown as bolts 323, extend through recessed openings 329 in the roller-mounting modules 320 to mount the modular noseroller assembly 300 to a conveyor frame.

Figure 9:
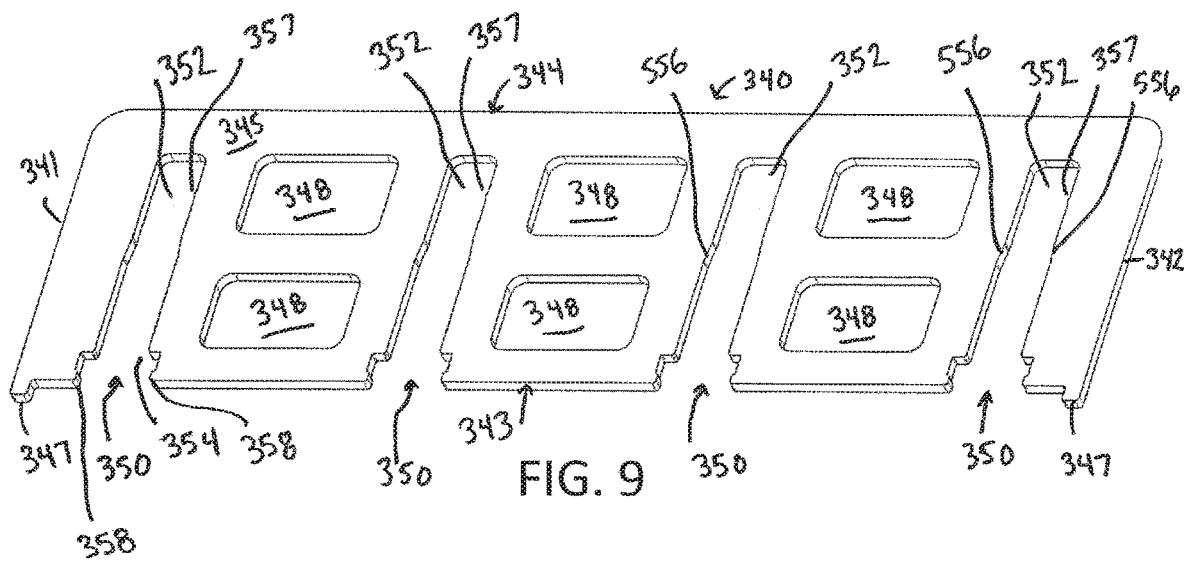
FIG. 9 is an isometric view of the baseplate of the modular noseroller assembly of FIG. 7.

Referring to FIG. 9, the base plate 340 is formed of laser-cut sheet metal with a plurality of openings. The base plate 340 extends from a first side 341 to a second side 342, from a front edge 343 to a back edge 344 and from a top surface 345 to an opposite bottom surface (not shown). The base plate 340 may span the width of the conveyor frame, which may range from a few inches to several feet. Alternatively, multiple base plates 340 arranged in series may span the width of the frame. A series of mounting openings 350 are formed in the front edge 343 and extend towards the back edge 344 for mounting and positioning the roller-mounting modules 320. The base plate 340 may also include weight-reducing openings 348 for reducing the weight of the base plate without compromising the strength and integrity of the base plate 340.

Each illustrative mounting opening 350 comprises a narrow rear slot 352 that extends across a substantial length of the base plate 340. The mounting opening widens to a relatively shorter front slot 354 and a narrowed entrance defined by lip 358. The narrow rear slot 352 tapers slightly in a middle portion to form angled shoulders 356 guiding the roller-mounting module 320 into a mounted position. In addition, a retention projection 357 may be formed on at least one side of the narrow rear slot 352 for retaining the roller-mounting modules 320 on the base plate 340. The illustrative retention projection 357 may be barb-shaped, having a gradual ramp during insertion, but forming a hard stop if motion reverses.

End projections 347 extending forward from the front edge 343 at each side 341, 342 of the base plate 340 are used to contain the axle 332 when mounted through the roller-mounting modules 320.

Figure 10:
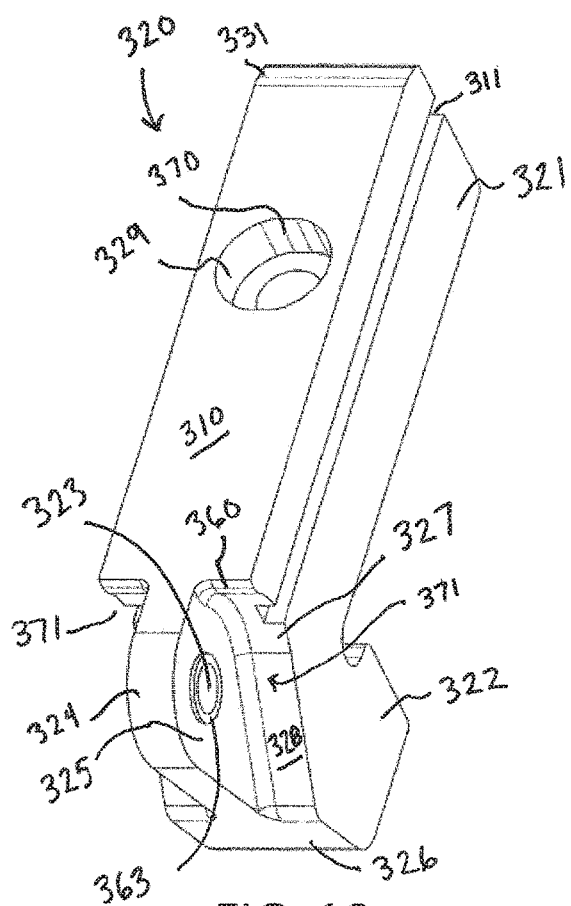
FIG. 10 is an isometric view of the roller-mounting module of the modular noseroller assembly of FIG. 7.
Figure 11:
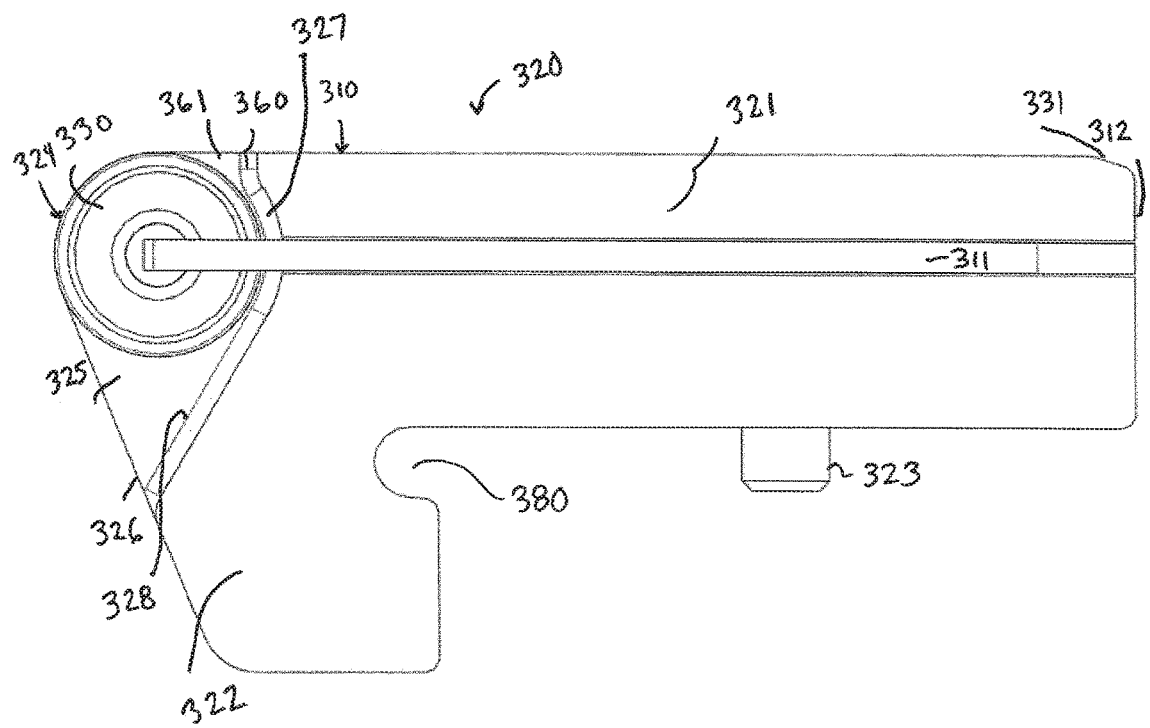
FIG. 11 is a side view of the roller-mounting module of the modular noseroller assembly of FIG. 7.
Figure 12:
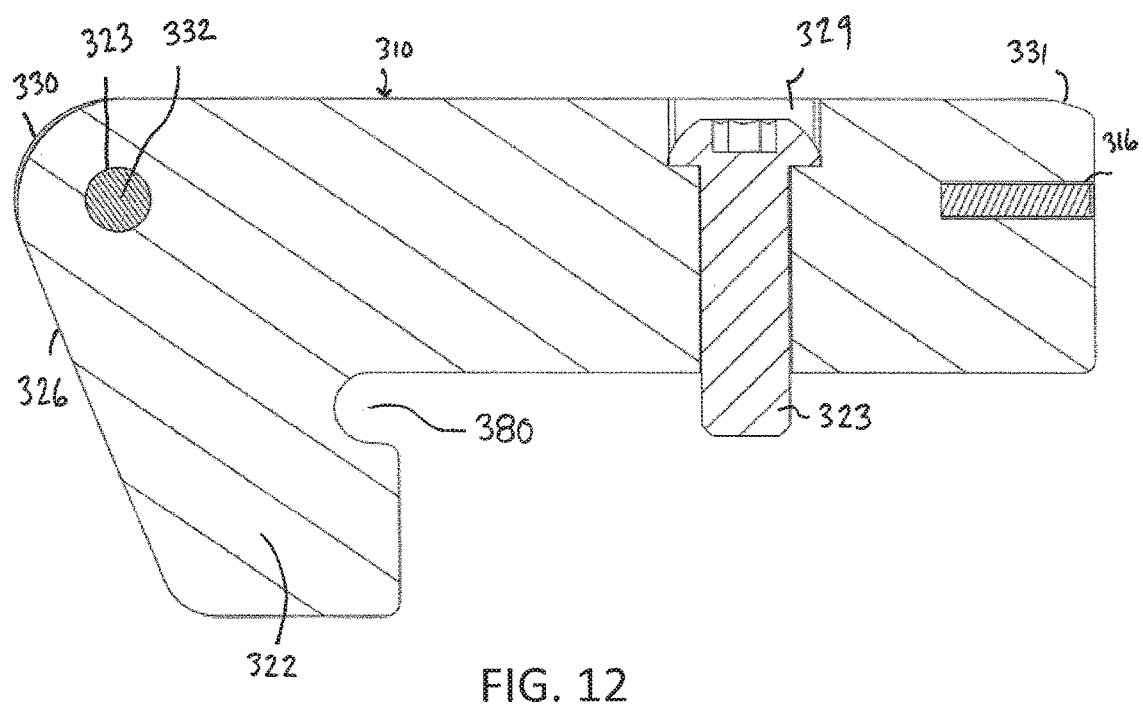
FIG. 12 is a cross-sectional side view of the roller-mounting module FIG. 11.
Figure 13:
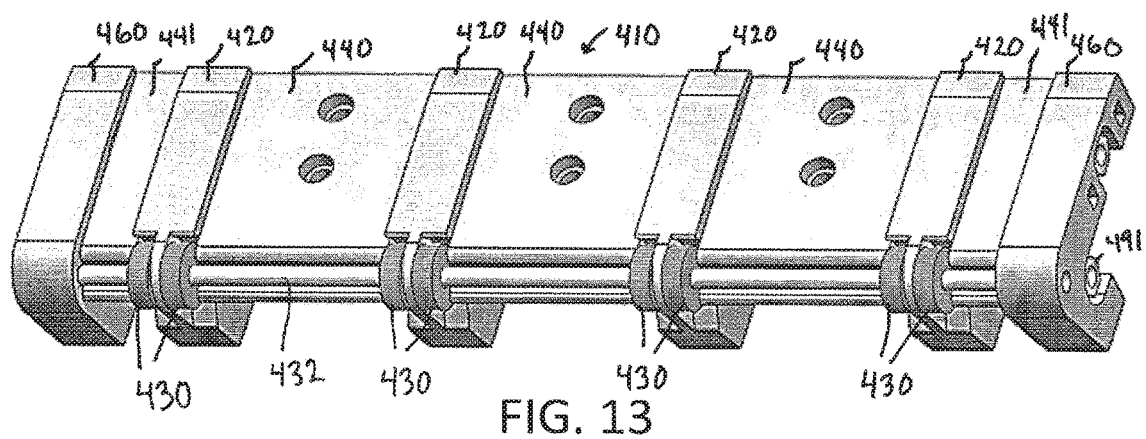
FIG. 13 is an isometric view of a modular noseroller assembly of another embodiment of the invention.
Figure 14:
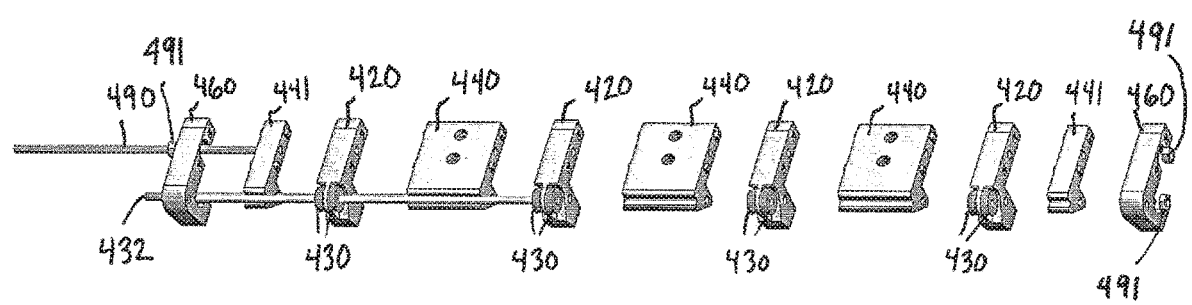
FIG. 14 is an exploded view of the modular noseroller assembly of FIG. 13.

Referring to FIGS. 10-12, each roller-mounting module 320 comprises a plate-connecting portion 321 for mounting the module 320 to a spacer, such as the base plate 340, and a roller-holding portion 322, shown as extending substantially perpendicular to the plate-connecting portion, for mounting rollers 330. The plate-connecting portion 321 also includes a recessed opening 329 for receiving an attachment bolt 323 for mounting the noseroller assembly 310 to a mounting plate or other suitable mounting structure in a conveyor frame.

As shown in FIGS. 10-12, the plate-connecting portion 321 of the roller-mounting module 320 has a top surface 310 and a mounting slot 311 extending from a back wall 312 to the front of the plate-connecting portion 321, though other suitable means for mounting the roller-mounting module 320 to a spacer may be used. The plate connecting portion 321 further includes a lateral through slot 316 intersecting the mounting slot 311 and extending from a first side to a second side of the plate-connecting portion for receiving the portion of the base plate between the narrow slot rear 352 and back edge 344. The top surface 310 provides a wear surface for contacting the conveyor belt and is positioned above the base plate 340 when assembled. The rear top edge 331 may be angled, chamfered, or rounded, to facilitate lead-in of an approaching conveyor belt.

The roller-holding portion 322 extends down and substantially perpendicular to the plate-connecting portion 321 and includes front recesses 371 separated by a stanchion 325 for holding a pair of rollers 330. The stanchion 325 has an opening 323 for receiving the axle 332. Alternatively, the roller-holding portion 322 can be comprise a single recess with axle-mounting walls on each side, or multiple recesses and stanchions. The stanchion 325 has a curved outer wall 324 that is slightly recessed from the rollers 330 when assembled to prevent interference with the conveyor belt. The curved outer wall 324 transitions to an inwardly sloping front wall 326. The conveyor belt rides against the sloping front wall 326, the angle of which may be configured to prevent or reduces vibration in the conveyor belt. The illustrative sloping front wall 326 is angled inwards between about 15° and about 30° and preferably between about 20° and about 25° relative to vertical. The illustrative angle is 22° relative to vertical, but the invention is not so limited. The illustrative sloping front wall 326 extends for a length that is about 1.5 times the length of the pitch for a conveyor belt employing the noseroller assembly 310, to limit vibrations, but the invention is not so limited.

The wall of the recess 371 has a top portion 360 that is slightly curved away from the rollers 330 to provide a clearance space 361 from the roller 330. The wall of the recess 371 transitions to a curved portion 327 mating the roller 330 and intersecting the mounting slot 311, and a straight forwardly-angled portion 328 that intersects the front wall 326, forming spaces in the recesses 371 under the rollers 330 to prevent or reduce the build-up of dust and debris.

As shown in FIG. 10, the bearing opening 323 may include a small protrusion 363 about its rim, which contacts the inner race of the roller 330 to provide clearance to facilitate free spinning of the roller 330 about the axle 332.

As also shown in FIG. 10, the fastener opening 329 may include flats 370 in a rear surface to facilitate press fit and facilitate handling during installation of the noseroller assemble 310. The fastener opening 329 receives fasteners 323 that extend through the bottom surface of the plate-connecting portion 321 for attachment to a conveyor frame. The depth and shape of the fastener opening 329 is selected to ensure clearance between the top of the fastener 323 and the top surface 310 of the roller-mounting module 320.

The illustrative roller-mounting module 320 further includes a recess 380 at the inner interface between the plate-connecting portion 321 and roller-holding portion 322. The recesses 380, which comprises a concave curve, but the invention is not so limited, may receive a front end of support structure for the modular noseroller assembly 310 to prevent clockwise rotation of the assembly, if desired.

FIGS. 13-18 show another embodiment of a modular noseroller assembly 410 comprising a number of modular components stacked and connected together to form the modular noseroller assembly. The illustrative modular noseroller assembly 410 comprises a plurality of roller-mounting modules 420 connected to and separated by primary spacer elements 440, with secondary spacer elements 441 and edge modules 460 at each side of the assembly. The roller-mounting modules 420 form a top wear surface for contacting the conveyor belt and retain the rollers 430 on an axle 432 extending through the assembly. One or more retaining rods 490 connect components together and form a backbone for the system. The edge modules 460 secure the retaining rods using nuts 491 fastened to threaded portions of the retaining rod, or other fasteners. The edge modules 460 also secure the axle 432 with nuts or other fasteners. The width of the modular noseroller assembly 410 may be easily modified by using various combinations and numbers of components.

Figure 15:
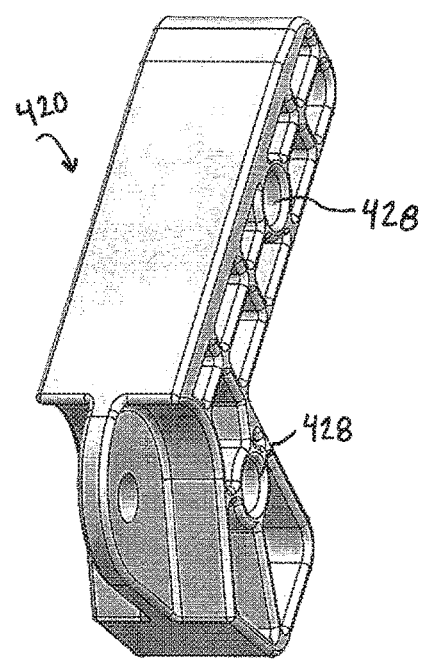
FIG. 15 is an isometric view of the primary spacer element of the modular noseroller assembly of FIG. 13.
Figure 16:
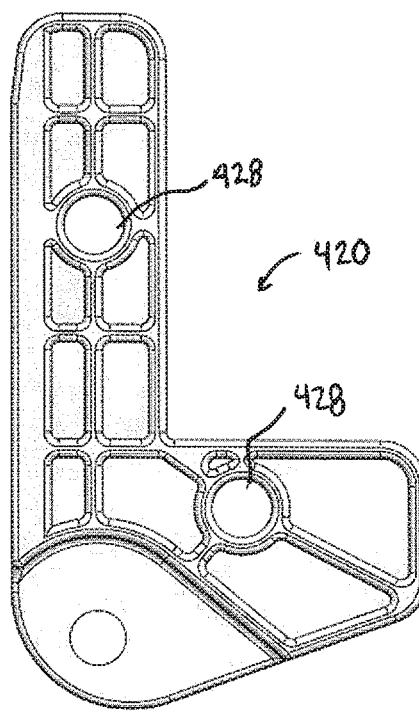
FIG. 16 is an isometric view of another embodiment of a primary spacer element for a modular noseroller assembly

The roller-mounting modules 420 are similar to the roller-mounting modules of FIGS. 1-6, except for the means for connecting the roller-mounting modules to the spacer element. While the roller-mounting modules 20 are designed to mate with the base plate 40, the illustrative roller mounting modules 420 are connected to the spacer elements 440 and each other to form the assembly using the retaining rod 490. As shown in FIGS. 15 and 16, the roller-mounting modules 420 include one or more lateral openings 428 in a spacer-connecting portion and—or a roller-mounting portion for receiving one or more retaining rods 490. The roller-mounting modules 420 also lack the connecting slot 211, but are otherwise similarly configured to the roller-mounting modules 20. Other suitable means for connecting the assembly components together can be used.

Figure 17:
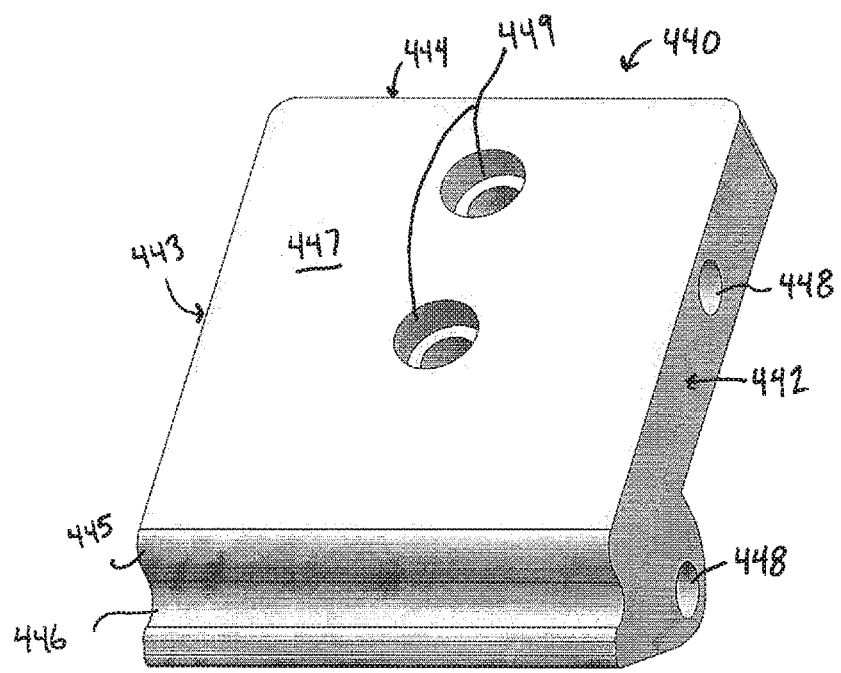
FIG. 17 is an isometric view of the roller-mounting module of the modular noseroller assembly of FIG. 13.

FIG. 17 shows an embodiment of a primary spacer element 440 for the modular noseroller assembly 410. The illustrative spacer element can be a modular component and has a planar portion having a top surface 447 extending from a first side 442 to a second side 443, defining the width of the space separating adjacent roller-mounting modules, and from a rear edge 444 to a front edge 445. The top surface 447 of the spacer element 440 is recessed below the top surface of a connected roller-mounting module 420 when the modular noseroller assembly is assembled. The width of the primary spacer element determines the separation distance between adjacent pairs of rollers on the assembly 410, which can be varied depending on the configuration of the particular conveyor belt used with the modular noseroller assembly 410. The front edge forms a recess 446 for cradling the axle 432, and is recessed from the front of the roller-mounting modules 420 when assembled. The primary spacer element further includes vertical openings 449 in the planar body for receiving fasteners to mount the assembly 410 to a conveyor frame, though other suitable means for connecting the modular noseroller assembly to a conveyor may be employed. Lateral openings 448 align with openings 428 to receive retaining rods to connect the assembly components together. The secondary spacing elements 441 can be similar, but smaller in width and lacking the mounting openings 449. The width of both the primary and secondary spacing elements can be varied, depending on the desired spacing between rollers.

Figure 18:
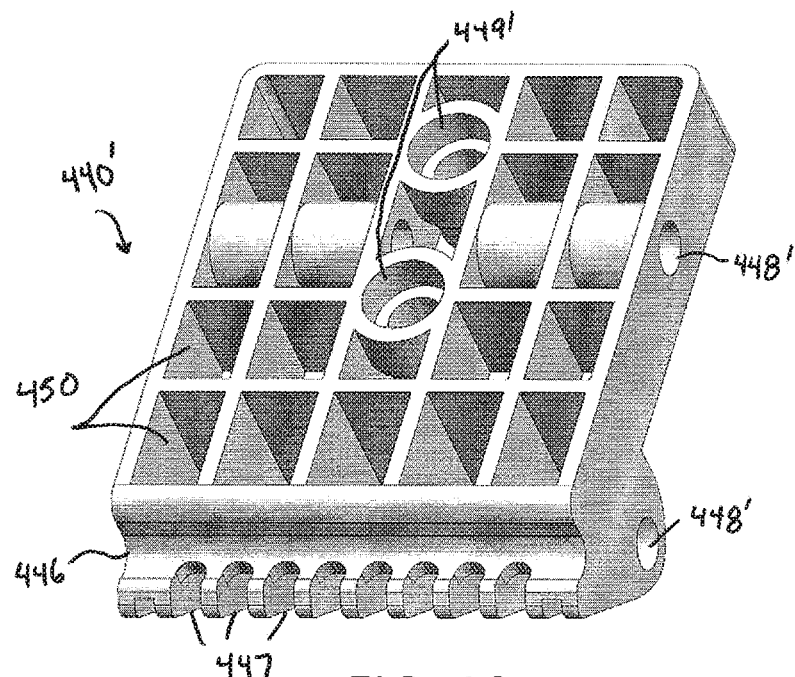
FIG. 18 is a side view of the roller-mounting module of the modular noseroller assembly of FIG. 13.

As shown in FIG. 18, in one embodiment, a primary spacer element 440' may include coring 450 to reduce the weight of the component and optional grooves 447 in the recess 446 to allow dust or other debris to fall through. The primary spacer element 440 can alternatively be cored from the bottom so that the part appears solid, from the top. The other elements, such as mounting openings 449' and lateral openings 448' are similar or identical to the primary spacer element 440 of FIG. 11.

Figure 19:
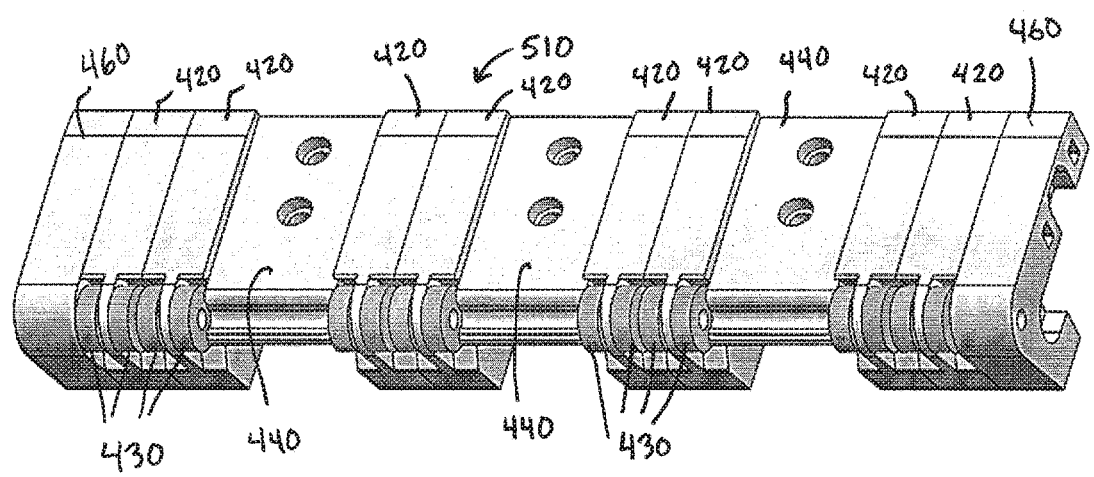
FIG. 19 is an isometric view of a high-density modular noseroller assembly of another embodiment of the invention.

As shown in FIG. 19, a higher-density modular noseroller assembly 510 comprises a two or more adjacent roller-mounting modules 420 stacked together and connected using spacer elements 440 of a selected size and edge modules 460, increasing the density and number of rollers 430 in the noseroller assembly 510 relative to the modular noseroller assembly 410. The number and spacing of the rollers can be modified as needed, depending on the requirements for the particular conveyor or conveyor belt in which a modular noseroller assembly is to be installed.

The illustrative modular noseroller assemblies can be easily assembled from a combination of selected, prefabricated components and can accommodate a variety of conveyor belt configurations and conditions.

The invention has been described relative to certain illustrative embodiments, but the scope of protection is not limited to these illustrative embodiments.

What is claimed is:

1. A modular noseroller assembly for transitioning a conveyor belt at an end of a carryway, comprising:
    a spacer element;
    a first roller-mounting module connected to the spacer element, the first roller-mounting module having a first front recess for mounting a first roller and a first opening for receiving an axle;
    a first roller mounted on the axle in the first front recess;
    a second roller-mounting module connected to the spacer element, the second roller-mounting module having a second front recess for mounting a second roller and a second opening for receiving the axle;
    a second roller mounted on the axle in the second front recess; and
    an axle extending through the first roller, the first opening, the second roller and the second opening.

2. The modular noseroller assembly of claim 1, wherein the spacer element comprises a base plate extending from a first side to a second side and from a front edge to a rear edge and including a first mounting opening in the front edge for receiving the first roller-mounting module and a second mounting opening in the front edge for receiving the second roller-mounting module.

3. The modular noseroller assembly of claim 2, wherein the base plate further includes end projections extending from the front edge at the first side and the second side for retaining the axle.

4. The modular noseroller assembly of claim 2, wherein each mounting opening comprises a narrow rear slot and a wider front slot open to the front edge, the narrow rear slot forming shoulders in the base plate for mounting a roller-mounting module.

5. The modular noseroller assembly of claim 4, wherein each roller-mounting module includes a mounting slot extending inwards from a back wall for receiving the shoulders of the base plate to connect the roller-mounting module to the base plate.

6. The modular noseroller assembly of claim 4, wherein at least one rear slot in the base plate includes a barb-shaped retention feature for retaining a roller-mounting module on the base plate.

7. The modular noseroller assembly of claim 1, wherein the first and second roller-mounting modules include inwardly sloping front walls below the front recesses for guiding a conveyor belt.

8. The modular noseroller assembly of claim 1, wherein the top surface of the first and second roller-mounting modules are above the top surface of the spacer element.

9. The modular noseroller assembly of claim 1, wherein the spacer element comprises a planar portion having a front recess for cradling the axle.

10. The modular noseroller assembly of claim 1, wherein the first and second roller-mounting modules include lateral openings and the spacer element includes at least one lateral opening configured to align with the lateral openings of the first and second roller-mounting modules and receive a retaining rod to connect the spacer element and first and second roller-mounting modules together.

11. The modular noseroller assembly of claim 1, wherein each roller-mounting module includes an opening in an upper surface for receiving a fastener to fasten the modular noseroller assembly to a conveyor frame.

12. The modular noseroller assembly of claim 1, wherein each roller-mounting module includes a recess at an inner interface between a plate-connecting portion and a roller-holding portion to limit clockwise rotation of the assembly.

13. A modular noseroller assembly, comprising:
a base plate formed of laser cut sheet metal extending from a first side to a second side and from a front edge to a rear edge and including a first mounting opening in the front edge and a second mounting opening in the front edge;
a first noseroller-mounting module mounted in the first mounting opening; and
a second noseroller-mounting module mounted in the second mounting opening.

14. The modular noseroller assembly of claim 13, wherein the base plate further includes end projections extending from the front edge at the first side and the second side for retaining an axle extending through a first roller in the first noseroller-mounting module and a second roller in the second noseroller-mounting module.

15. A roller-mounting module for mounting a roller to a spacer element of a modular noseroller assembly, comprising:
a spacer-connecting portion for mounting the roller-mounting module to a spacer element; and
a roller-holding portion extending substantially perpendicular to the plate-connecting portion for mounting a roller; and
a connector for connecting the roller-mounting module to the spacer element, wherein the connector comprises a slot extending from a rear edge of the plate-connecting portion for receiving an edge of a mounting slot in a base plate comprising the spacer element.

16. A method of assembling a modular noseroller assembly, comprising the steps of:
providing a spacer element;
mounting a first roller-mounting module to the spacer element;
mounting a second roller-mounting module to the spacer element;
inserting rollers in front recesses of the first and second roller-mounting modules; and
sliding an axle through the rollers and aligned front openings in the spacer elements to integrate the rollers in the assembly.

\* \* \* \* \*